US008535120B2

(12) United States Patent
Zemenchik et al.

(10) Patent No.: US 8,535,120 B2
(45) Date of Patent: *Sep. 17, 2013

(54) BLADE SHARPENING SYSTEM FOR AGRICULTURAL IMPLEMENTS

(75) Inventors: Robert A. Zemenchik, Kenosha, WI (US); Ivan Rieke, Congerville, IL (US); Mark Hoffman, Deer Creek, IL (US); Ross L. Gingrich, Roanoke, IL (US); Ben G. Zimmerman, Eureka, IL (US); Alan R. Martin, Secor, IL (US); Tracey D. Meiners, Mackinaw, IL (US); Michael G. Kovach, Morton, IL (US); Paul Hurtis, Mackinaw, IL (US)

(73) Assignee: CNH America LLC, New Holland, PA (US)

( * ) Notice: Subject to any disclaimer, the term of this patent is extended or adjusted under 35 U.S.C. 154(b) by 362 days.

This patent is subject to a terminal disclaimer.

(21) Appl. No.: 12/872,776

(22) Filed: Aug. 31, 2010

(65) Prior Publication Data

US 2012/0052776 A1    Mar. 1, 2012

(51) Int. Cl.
 *B24B 3/46* (2006.01)
 *B24B 41/02* (2006.01)
 *B24B 3/58* (2006.01)

(52) U.S. Cl.
 USPC .......... 451/293; 451/290; 451/342; 451/420; 451/486

(58) Field of Classification Search
 USPC ................ 172/437, 558–562, 565, 566, 606, 172/609, 610; 451/123, 242, 283, 290, 293, 451/321, 342, 349, 358, 359, 419–22, 486–87, 451/63, 917; 76/85, 87–89
 See application file for complete search history.

(56) References Cited

U.S. PATENT DOCUMENTS

| | | | | |
|---|---|---|---|---|
| 323,344 A | * | 7/1885 | La Dow | 172/579 |
| 548,198 A | | 10/1895 | Hoyman | |
| 555,936 A | * | 3/1896 | Elliott | 76/85 |
| 603,172 A | | 4/1898 | Christopherson | |
| 718,966 A | | 1/1903 | Grimm | |
| 872,981 A | | 12/1907 | Wissler | |
| 939,115 A | | 11/1909 | Ward | |
| 939,713 A | | 11/1909 | Klenke | |
| 946,675 A | * | 1/1910 | Karr et al. | 172/437 |
| 958,077 A | * | 5/1910 | Bender | 76/85 |
| 1,044,137 A | * | 11/1912 | Cassady | 451/423 |
| 1,069,499 A | * | 8/1913 | Trone | 76/85 |
| 1,339,043 A | * | 5/1920 | Schmidt | 451/423 |
| 1,738,003 A | * | 12/1929 | Hill | 76/85 |
| 1,838,657 A | | 12/1931 | Case | |

(Continued)

OTHER PUBLICATIONS

"EdgeCare" Disc Sharpening System; 2010 Ingersoll Tillage Group, Inc.; http://www.ingersolltillage.com/edgecare.html.

(Continued)

*Primary Examiner* — Lee D Wilson
*Assistant Examiner* — Tyrone V Hall, Jr.
(74) *Attorney, Agent, or Firm* — Rebecca Henkel

(57) ABSTRACT

A blade sharpening system is provide that includes a base and a pendulous arm having a first end rotatably coupled to the base by a pivot joint. The blade sharpening system also includes a sharpener suspended by the pendulous arm and configured to engage a generally circular agricultural implement blade while mounted on the agricultural implement. The pendulous arm is configured to enable movement of the sharpener to accommodate lateral variations in blade profile.

15 Claims, 8 Drawing Sheets

(56) References Cited

U.S. PATENT DOCUMENTS

| | | | | |
|---|---|---|---|---|
| 2,185,519 A | * | 1/1940 | Randall | 451/258 |
| 2,510,601 A | * | 6/1950 | Pater | 451/349 |
| 2,533,009 A | | 12/1950 | Harsh | |
| 2,541,829 A | * | 2/1951 | Peddicord | 76/85 |
| 2,565,916 A | * | 8/1951 | Frusher | 451/422 |
| 2,597,325 A | * | 5/1952 | Hodges | 451/258 |
| 2,933,865 A | | 4/1960 | Miller | |
| 3,205,623 A | * | 9/1965 | Clayborne et al. | 451/347 |
| 3,694,969 A | * | 10/1972 | Hahn et al. | 451/25 |
| 4,113,030 A | * | 9/1978 | Walker | 172/566 |
| 6,758,730 B1 | * | 7/2004 | Bernhard | 451/349 |
| 7,114,413 B1 | | 10/2006 | Behan | |

OTHER PUBLICATIONS

U.S. Appl. No. 12/872,740, filed Aug. 31, 2010, Meiners.

* cited by examiner

BLADE SHARPENING SYSTEM FOR AGRICULTURAL IMPLEMENTS

BACKGROUND

The invention relates generally to ground working equipment, such as agricultural equipment, and more specifically, to a blade sharpening system for agricultural implements.

It is well known that to attain the best agricultural performance from a piece of land, a farmer must cultivate the soil, typically through a tilling operation. Common tilling operations include plowing, harrowing, and sub-soiling. Modern farmers perform these tilling operations by pulling a tilling implement behind a motorized tractor. Depending on the crop selection and the soil conditions, a farmer may need to perform several tilling operations at different times over a crop cycle to properly cultivate the land to suit the crop choice. In one type of tilling operation, rows of blades are pulled through soil to break up clods or lumps of soil, as well as old plant material to provide a more amenable soil structure for planting and to level the soil surface.

As will be appreciated, maintaining a sharp edge on the blades enables the blades to cut plant residue efficiently. Unfortunately, contact with the soil causes the edge of the blades to become dull over time. Therefore, a farmer may periodically (e.g., every few months) sharpen the blades to maintain efficient operation of the tillage implement. Due to the large number of blades on a typical tillage implement, the process of sharpening each blade may be exceedingly time consuming. For example, a farmer may remove each blade from the implement and sharpen the edge of the blade with a handheld grinder. Alternatively, the farmer may utilize a portable blade sharpener having transport wheels. The portable sharpener may be successively rolled into alignment with each blade to sharpen the edge of the respective blade. While this configuration enables the blades to be sharpened while on the implement, the portable sharpener typically requires a substantially flat surface to facilitate alignment between a grinding disc and the blade. Consequently, the portable sharpener may not be utilized to sharpen blades in the field. Moreover, because the position of the grinding disc is fixed with respect to the blade, the portable sharpener may be unable to effectively sharpen fluted or wavy blades.

BRIEF DESCRIPTION

A blade sharpening system is provide that includes a base and a pendulous arm having a first end rotatably coupled to the base by a pivot joint. The blade sharpening system also includes a sharpener suspended by the pendulous arm and configured to engage a generally circular agricultural implement blade while mounted on the agricultural implement. The pendulous arm is configured to enable movement of the sharpener to accommodate lateral variations in blade profile.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
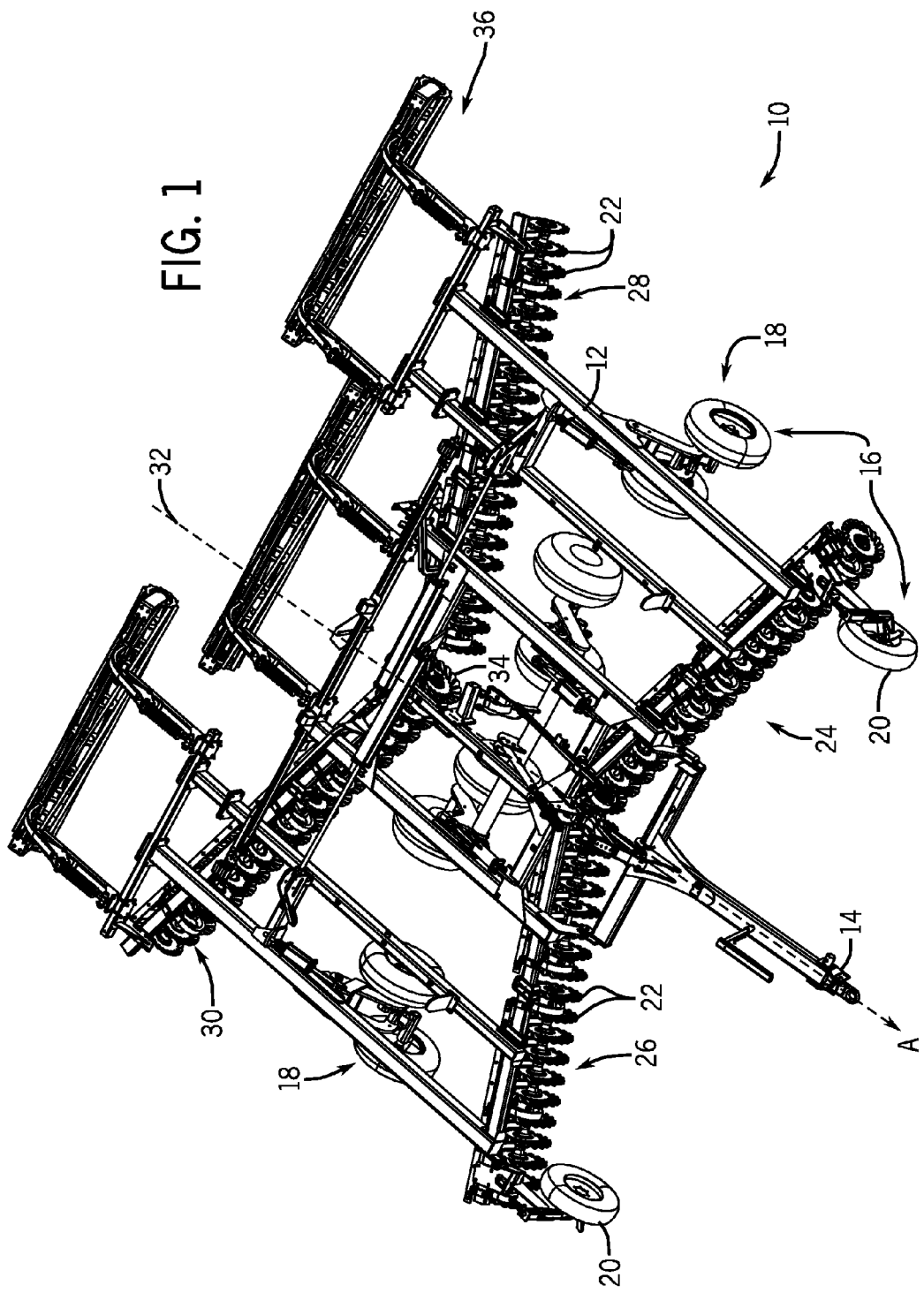
FIG. 1 is a perspective view of an exemplary agricultural implement.

Turning now to the drawings, FIG. 1 is a perspective view of an exemplary agricultural implement 10. While a vertical tilling implement 10 is shown and described below, it should be appreciated that the blade sharpening system may be utilized to sharpen blades on any other suitable agricultural implement. As will be appreciated, an agricultural vehicle is configured to pull the vertical tilling implement 10 in a direction of motion A. The vertical tilling implement 10 includes a main frame 12. The main frame 12 has a hitch 14 on the front end that may be used to connect the vertical tilling implement 10 to the agricultural vehicle, such as a tractor or other prime mover. Additionally, a set of wheels 16 is connected to the main frame 12. The set of wheels 16 is oriented in a direction that is in general alignment with the direction of motion A. The set of wheels 16 includes a set of center wheels 18 and a set of pivoting wheels 20. The set of center wheels 18 is attached across the main frame 12 at positions, for example, roughly midway between the front and rear ends of the main frame 12. The set of center wheels 18 may include a system for adjusting the distance between the main frame 12 and the set of center wheels 18. This system for adjusting may permit the set of center wheels 18 to be statically fixed during the movement of the vertical tilling implement 10 or to be dynamically adjustable as the vertical tilling implement 10 travels. The set of pivoting wheels 20 is connected to the front distal ends of the main frame 12, and may reduce the amount of lateral movement of vertical tilling implement 10 as it is pulled.

The vertical tilling implement 10 also includes multiple rows of fluted-concave blades 22 attached to the main frame 12. In certain configurations, the rows of fluted-concave blades 22 are indexed. In particular, the rows of fluted-concave blades 22 includes a front left row 24, a front right row 26, a rear left row 28, and a rear right row 30. When indexed, the front left row 24 and the front right row 26 are aligned with the rear left row 28 and the rear right row 30 such that areas of ground between the blades in the front left rows 24 and the front right row 26 are engaged by the blades in the rear left row 28 and the rear right row 30 as the tilling implement is pulled forward.

In the illustrated embodiment, the front left row 24 is symmetric about a centerline 32 of the vertical tilling implement 10 with the front right row 26. Likewise, the rear left row 28 is symmetric about the centerline 32 of the vertical tilling implement 10 with the rear right row 30. Additionally, the front left row 24 is substantially symmetric about a line perpendicular to the direction of motion A with the rear left row 28. Likewise, the front right row 26 is substantially symmetric about a line perpendicular to the direction of motion A with a rear right row 30. These general symmetries may involve some of the rows being offset relative to the others to achieve the indexing of the blades as described above.

When the rows of concave blades 22 are arranged in a symmetrical arrangement about the centerline 32, such as illustrated in FIG. 1, a gap between each side of symmetrical rows may be created. A center tilling member 34 may be placed in this gap to ensure that all the soil passing under the vertical tilling implement 10 is tilled as the tilling implement is pulled forward. The center tilling member 34 may be a coulter, as shown in FIG. 1, another fluted blade, or the like.

While four rows of fluted-concave blades 22 are employed in the illustrated embodiment, it should be appreciated that more or fewer rows may be utilized in alternative embodiments. Additionally, while the illustrated embodiment shows the rows of fluted-concave blades 22 having an x-shaped configuration based on the described symmetry, the rows of fluted-concave blades 22 may have a different configuration. For example, the rows of fluted-concave blades 22 may have a diamond configuration, a k-shaped configuration, or all may be parallel with each other in a direction perpendicular to the direction of motion A. Furthermore, it is contemplated that some or all of the rows may be configured in asymmetric arrangements.

Rolling basket assemblies 36 are connected to the rear end of the main frame 12 to provide downward pressure. As will be appreciated, the rolling basket assemblies 36 may be replaced with any other acceptable member that is capable of exerting a desired downward pressure, including drag harrows, and the like. Although FIG. 1 shows three rolling basket assemblies 36, two of which having rotational axes which are not collinear with the third, the rolling basket assemblies 36 may include fewer or more members providing downward force.

As discussed in detail below, a blade sharpening system may be employed to sharpen the edges of the fluted-concave blades 22, thereby maintaining efficient operation of the implement 10. As will be appreciated, maintaining a sharp edge on the blades 22 enables the blades 22 to cut plant residue efficiently. Consequently, it may be desirable to periodically (e.g., every few months) sharpen each blade 22 on the implement 10. The blade sharpening system described below includes a sharpener configured to engage a blade 22 of the agricultural implement 10. The blade sharpening system also includes a rail configured to support the sharpening assembly and to facilitate movement of the sharpening assembly along the rail. The blade sharpening system further includes a mounting feature coupled to the rail and configured to engage a structural member of the agricultural implement 10 to support the rail and sharpening assembly. In this configuration, the sharpening assembly may be translated along the rail and aligned with successive blades 22, thereby facilitating blade sharpening operations.

While the implement 10 shown and described below utilizes generally circular fluted-concave blades, it should be appreciated that alternative implements may employ other blade configurations. For example, certain implements may include fluted blades having no concavity (i.e., substantially flat). Alternative implements may include smooth-edged concave blades, i.e., blades having no flutes. Yet further implements may employ wavy blades, flat blades, or other blade configurations. In addition, certain implements may utilize a combination of blades. Because certain embodiments of the blade sharpening system are configured accommodate lateral variations in blade profile, the blade sharpening system may be utilized to sharpen any of the blade configurations described above, or other suitable blade configurations.

Figure 2:
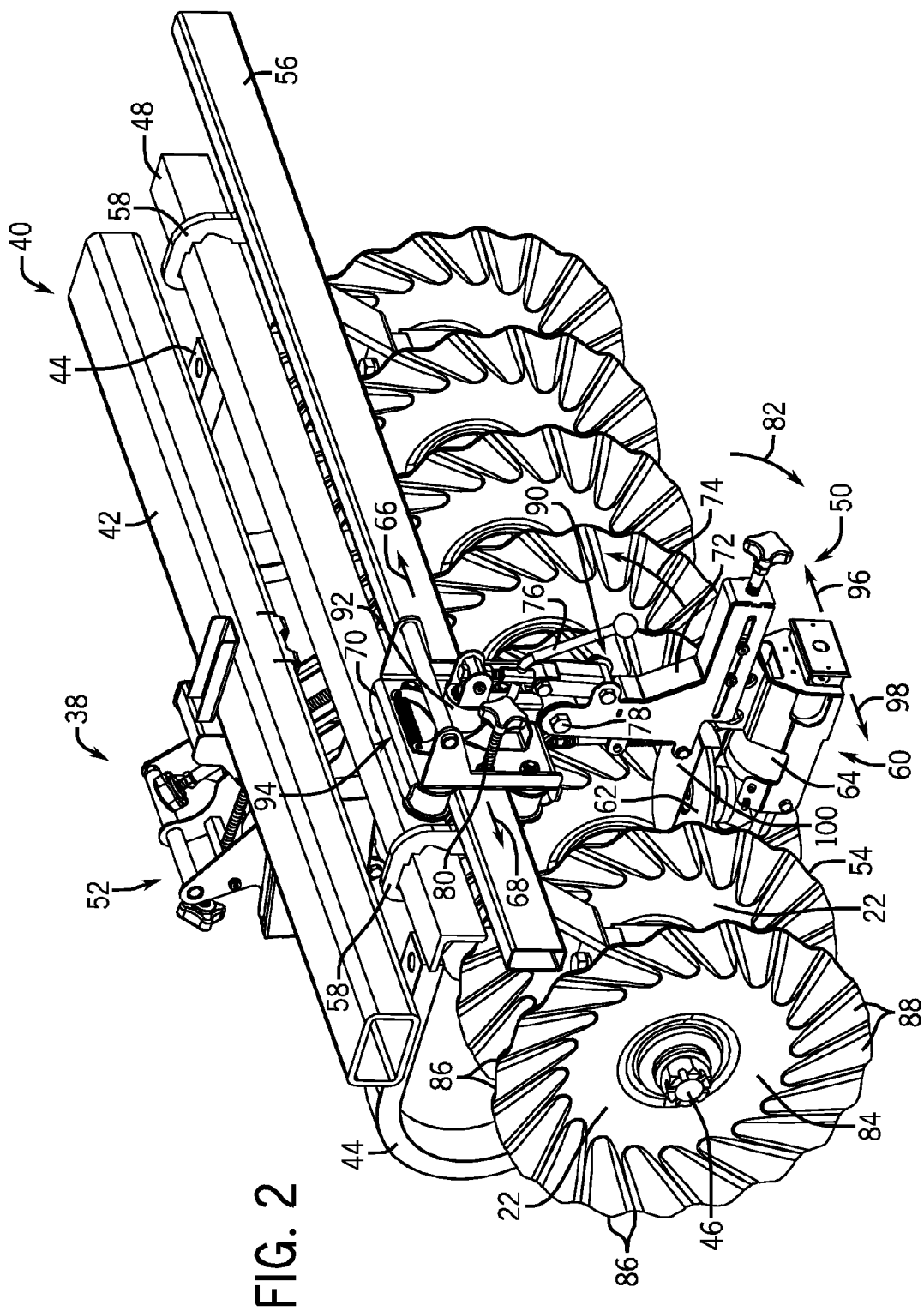
FIG. 2 is a perspective view of an exemplary blade sharpening system that may be employed to sharpen blades of the agricultural implement.

FIG. 2 is a perspective view of an exemplary blade sharpening system 38 that may be employed to sharpen blades 22 of the agricultural implement 10. As illustrated, the blade sharpening system 38 is coupled to a gang 40 of blades 22. As will be appreciated, the gang 40 may form part of a row (e.g., 24, 26, 28, or 30) of blades 22 within the implement 10. The blades 22 within the gang 40 are configured to rotate together, and each row may include multiple (e.g., 1, 2, 3, 4, or more) gangs 40. In the illustrated embodiment, a gang tube 42 extends along a direction substantially parallel to an axis of rotation of the blades 22. Consequently, the blades 22 are oriented perpendicularly to the gang tube 42. As illustrated, multiple support members 44 extend between the gang tube 42 and an axle 46 of the gang 40, thereby supporting the blades 22. In the present embodiment, the gang tube 42 is secured to the frame 12 of the implement 10 at a desired angle for tilling operations. The gang 40 also includes an angled beam 48 configured to support scrapers positioned adjacent to the blades 22 and configured to remove accumulated dirt and debris from the blades 22. The angled beam 48 may be secured to the gang tube 42, the implement frame 12, or a combination thereof.

In the illustrated embodiment, the blade sharpening system 38 includes a sharpening assembly 50 and a drive unit 52. As discussed in detail below, the sharpening assembly 50 is configured to sharpen an edge 54 of each blade 22, while the drive unit 52 rotates the blade 22 relative to the sharpening assembly 50. In this manner, the sharpening assembly 50 may evenly sharpen the edge 54 along the entire circumference of the blade 22. As illustrated, the drive unit 52 is secured to the gang tube 42, and the sharpening assembly 50 is secured to the angled beam 48. Consequently, the entire blade sharpening system 38 is supported by structural elements of the implement 10. Specifically, the blade sharpening system 38 includes a rail 56 configured to support the sharpening assembly 50 and to facilitate movement of the sharpening assembly 50 along the rail 56. The blade sharpening system 38 also includes mounting features, such as the illustrated hooks 58, coupled to the rail 56 and configured to engage the angled beam 48 of the agricultural implement 10 to support the rail 48 and sharpening assembly 50. In this configuration, the sharpening assembly 50 may be translated along the rail 56 and aligned with successive blades 22, thereby facilitating blade sharpening operations. While the drive unit 52 is coupled to the gang tube 42 and the hooks 58 are coupled to the angled beam 48 in the present embodiment, it should be appreciated that the drive unit 52 and/or sharpening assembly 50 may be coupled to other structural members of the agricultural implement 10 in alternative embodiments. Furthermore, while the sharpening assembly 50 and the drive unit 52 are separate components in the present embodiment, it should be appreciated that alternative embodiments may employ a single assembly including the sharpening assembly 50 and the drive unit 52.

In the illustrated embodiment, the sharpening assembly 50 includes a sharpener 60 configured to engage each blade 22 of the gang 40. The sharpener 60 includes a grinding disc 62 configured to sharpen the edge 54 of the blade 22, and a motor 64 configured to drive the grinding disc 62 to rotate. As will be appreciated, contact between the rotating grinder disc 62 and the blade 22 removes a small amount of material from the edge 54 of the blade 22, thereby increasing blade sharpness. As discussed in detail below, operation of the sharper 60 may be coordinated with operation of the drive unit 52 such that the blade 22 is driven to rotate as the grinder disc 62 sharpens the edge 54 of the blade 22. Consequently, the present blade sharpening system 38 may provide a substantially uniform blade edge 54, thereby increasing the plant residue cutting effectiveness of the blade 22. In addition, while the drive unit 52 is configured to drive a single blade 22, rotation of the single blade 22 will drive each blade 22 in the gang 40 to rotate because the blades 22 are keyed to the axle 46. Consequently, the drive unit 52 may remain in one location as the sharpening assembly 50 is moved between blades 22.

As previously discussed, the sharpening assembly 50 is configured to translate along the rail 56 in a first direction 66 and a second direction 68, thereby enabling the sharpening assembly 50 to access each blade 22 within the gang 40. In the illustrated embodiment, the sharpening assembly 50 includes a carrier 70 configured to engage the rail 56 and to facilitate movement of the sharpening assembly 50 along the rail 56. The sharpening assembly 50 also includes a sharpener support 72 configured to support the sharpener 60. In the present embodiment, the sharpener support 72 is rotatable in a direction 74 relative to the carrier 70 between a blade-engaged position and a blade-disengaged position. Specifically, to facilitate movement of the sharpening assembly 50 from presently engaged blade to another blade 22 on the gang 40, an operator may lift a handle 76 upwardly, thereby inducing the sharpener support 72 to rotate about a pivot 78 in the direction 74 relative to the carrier 70. Rotating the sharpener 60 in the direction 74 extracts the sharpener 60 from a region between adjacent blades 22, thereby substantially reducing or eliminating the possibility of contact between the sharpener 60 and the blades 22 as the sharpener 60 translates in the direction 66 or 68.

As illustrated, the carrier 70 includes a locking mechanism, such as the illustrated set screw 80, configured to selectively block movement of the sharpening assembly 50 along the rail 56. Consequently, to facilitate movement of the sharpening assembly 50, an operator may rotate the set screw 80, thereby reducing the contact force between the screw 80 the rail 56 and enabling movement of the sharpening assembly 50 in the direction 66 or 68. Once the locking mechanism has been released, the operator may translate the sharpening assembly 50 to a position substantially aligned with a subsequent blade 22. The operator may then tighten the set screw 80 to block movement of the sharpening assembly 50 with respect to the rail 56, and move the handle 76 downwardly, thereby rotating the sharpener 60 in the direction 82 about the pivot 78. In this manner, the sharpening assembly 50 may be positioned to sharpen each blade 22 within the gang 40. Because the blade sharpening system 38 is fully supported by structural elements of the implement 10, blade sharpening operations may be performed while the implement 10 is positioned on substantially any surface, even the soil of a field. Consequently, the duration associated with sharpening blades of a tillage implement may be substantially reduced, thereby increasing the availability of the implement 10 for tillage operations.

As previously discussed, the present implement 10 includes concave-fluted blades 22. As illustrated, each blade 22 includes a flat center portion 84 and a series of crests and troughs 86 extending a-radially inward from the outer periphery of the blade 22. The series of crests and troughs 86 forms multiple flutes 88. As will be appreciated, employing fluted concave blades 22 may permit the use of more aggressive gang angles without resulting in increased blade failures or the generation of large clumps of soil requiring multiple passes, and/or may enable the implement 10 to travel at greater speeds than the known tilling systems having freely-rotatable blades. Unfortunately, blade sharpening systems employing fixed sharpeners may be unable to follow the contours of the fluted blades 22, thereby resulting in an uneven edge 54 that is less effective for cutting plant residue. Consequently, certain embodiments of the blade sharpening system 38 are configured to accommodate lateral variations in blade profile, thereby enabling the blade sharpening system 38 to be utilized for sharpening fluted-concave blades 22, or other suitable blade configurations.

In certain embodiments, the blade sharpening assembly 50 includes a base member, such as the illustrated carrier 70, and a pendulous arm 90 having a first end rotatably coupled to the carrier 70 by a pivot joint 92. The blade sharpening assembly 50 also includes the sharpener 60 coupled to a second end of the pendulous arm 90 and configured to engage the blade 22 of the agricultural implement 10. The pendulous arm 90 is configured to enable movement of the sharpener 60 relative to a neutral position to accommodate lateral variations in blade profile. As discussed in detail below, the blade sharpening assembly 50 also includes a centering assembly 94 configured to bias the sharpener 60 toward to the neutral position. For example, when aligning the sharpener 60 with a blade 22, the carrier 70 may be translated in the direction 68 until the grinding disc 62 contacts the blade 22. The carrier 70 may then be translated an additional small distance in the direction 68, thereby inducing the sharpener 60 to rotate in the direction 96 about the pivot 92. As will be appreciated, due to the weight of the sharpener 60 and/or the bias of the centering assembly 94, the sharpener 60 will be driven in the direction 98, thereby establishing a contact force between the grinding disc 62 and the blade 22. As the drive unit 52 induces the blade 22 to rotate, the contours of the fluted blade 22 will induce the sharpener 60 to rotate in the directions 96 and 98 about the pivot 92. As a result, the illustrated sharpening assembly 50 may provide the fluted blade 22 with a substantially uniform sharp edge 54, thereby enabling the blade 22 to efficiently cut plant residue.

While the illustrated sharpener 60 is configured to sharpen a first side of each blade 22, it should be appreciated that the sharpener 60 may be configured to sharpen a second side of each blade 22. For example, a guard 100 covering a first side of the grinder disc 62 may be attached to a second side of the grinder disc 62, thereby facilitating contact between the first side of the grinder disc 62 and the second side of each blade 22. In addition, it should be appreciated that the grinder disc 62 of the illustrated embodiment may be replaced with an alternative device, such as an edge roller, a polishing wheel or a wire wheel brush in alternative embodiments to sharpen the blades 22.

Figure 3:
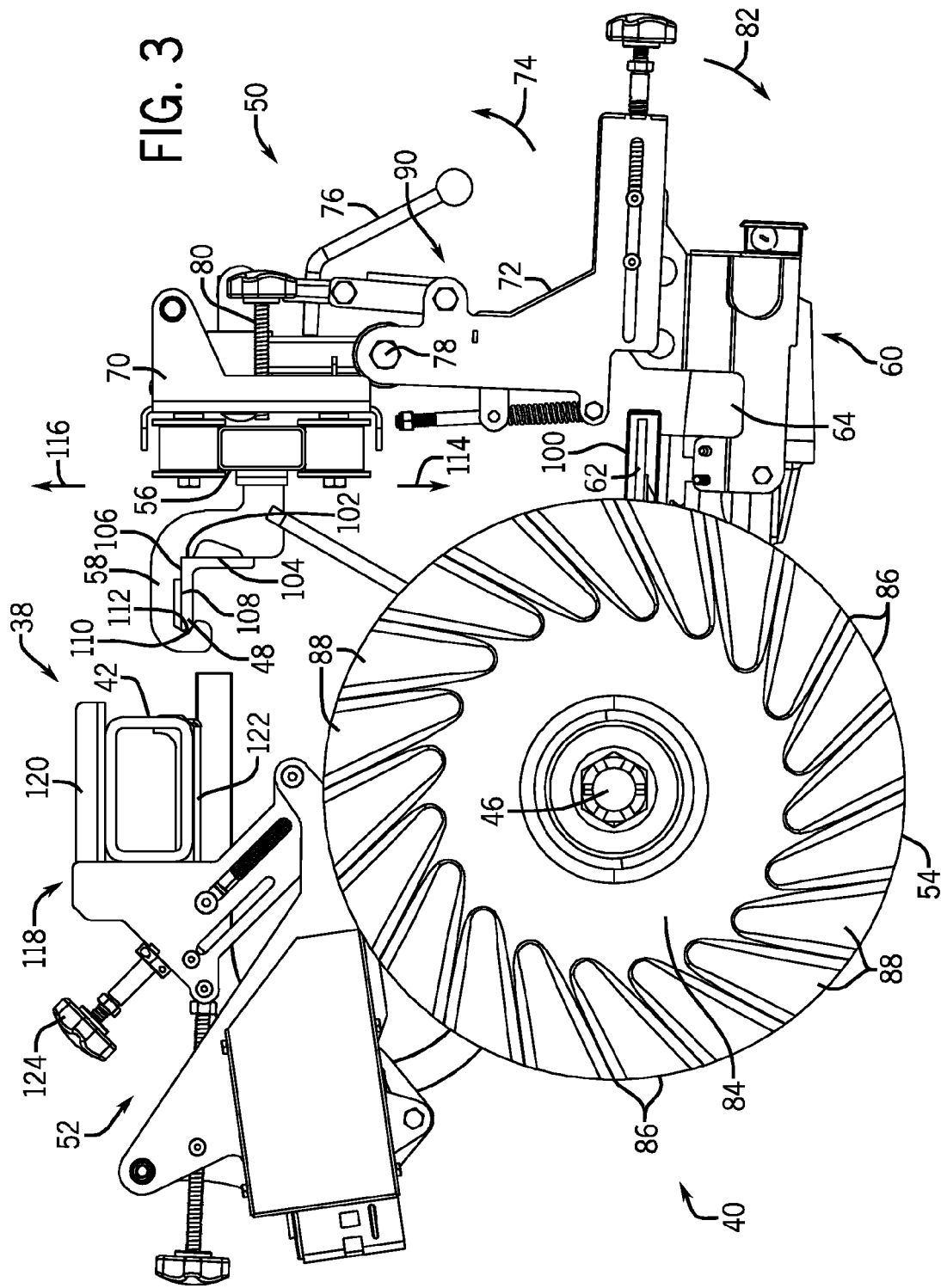
FIG. 3 is a side view of the blade sharpening system of FIG. 2 mounted to a row of blades, showing a sharpening assembly and a drive unit of the blade sharpening system.

FIG. 3 is a side view of the blade sharpening system of FIG. 2 mounted to a row of blades 22, showing the sharpening assembly 50 and the drive unit 52 of the blade sharpening system 38. As previously discussed, the sharpening assembly 50 includes a hook 58 coupled to the rail 56 and configured to engage the angled beam 48 of the agricultural implement 10 to support the rail 56 and sharpening assembly 50. As illustrated, the hook 58 includes first flat surface 102 configured to contact a second flat surface 104 of the angled beam 48, and a third flat surface 106 configured to contact a fourth flat surface 108 of the angled beam 48. In addition, the hook 58 includes a recess 110 configured to capture an end 112 of the angled beam 48. In this configuration, the hook 58 may be coupled to the angled beam 48 by disposing the recess 110 about the end 112, and then rotating the sharpening assembly 50 in the direction 82 until the first surface 102 contacts the second surface 104, and the third surface 106 contacts the fourth surface 108. Once engaged, contact between the hook 58 and the angled beam 48 will block rotation of the rail 56 and sharpening assembly 50 in the direction 82 and translation in the direction 114. To remove the rail 56 and sharpening assembly 50, the sharpening assembly 50 may be rotated in the direction 74 and lifted upwardly in the direction 116. The blade sharpening system 38 may then be transferred to another gang 40 for additional blade sharpening operations. Because the hook 58 is configured to secure the rail 56 and sharpening assembly 50 to the implement 10 without fasteners, the blade sharpening system 38 may be readily transferred between gangs 40.

The drive unit 52 also includes a mounting feature, such as the illustrated clamp 118, configured to removably secure the drive unit 52 to the gang tube 42 of the agricultural implement 10. As illustrated, the clamp 118 includes a fixed upper jaw 120 and a movable lower jaw 122. In the illustrated embodiment, rotation of a set screw 124 drives the lower jaw 122 in the downward direction 114 or the upward direction 116. In this configuration, the drive unit 52 may be readily uncoupled from the gang tube 42 of a first gang 40 and secured to the gang tube 42 of a second gang 40. In addition, because the position of the lower jaw 122 is adjustable (e.g., vertically and horizontally with respect to the fixed upper jaw 120), the drive unit 52 is mountable to various tubes 42 having different heights and widths.

Figure 4:
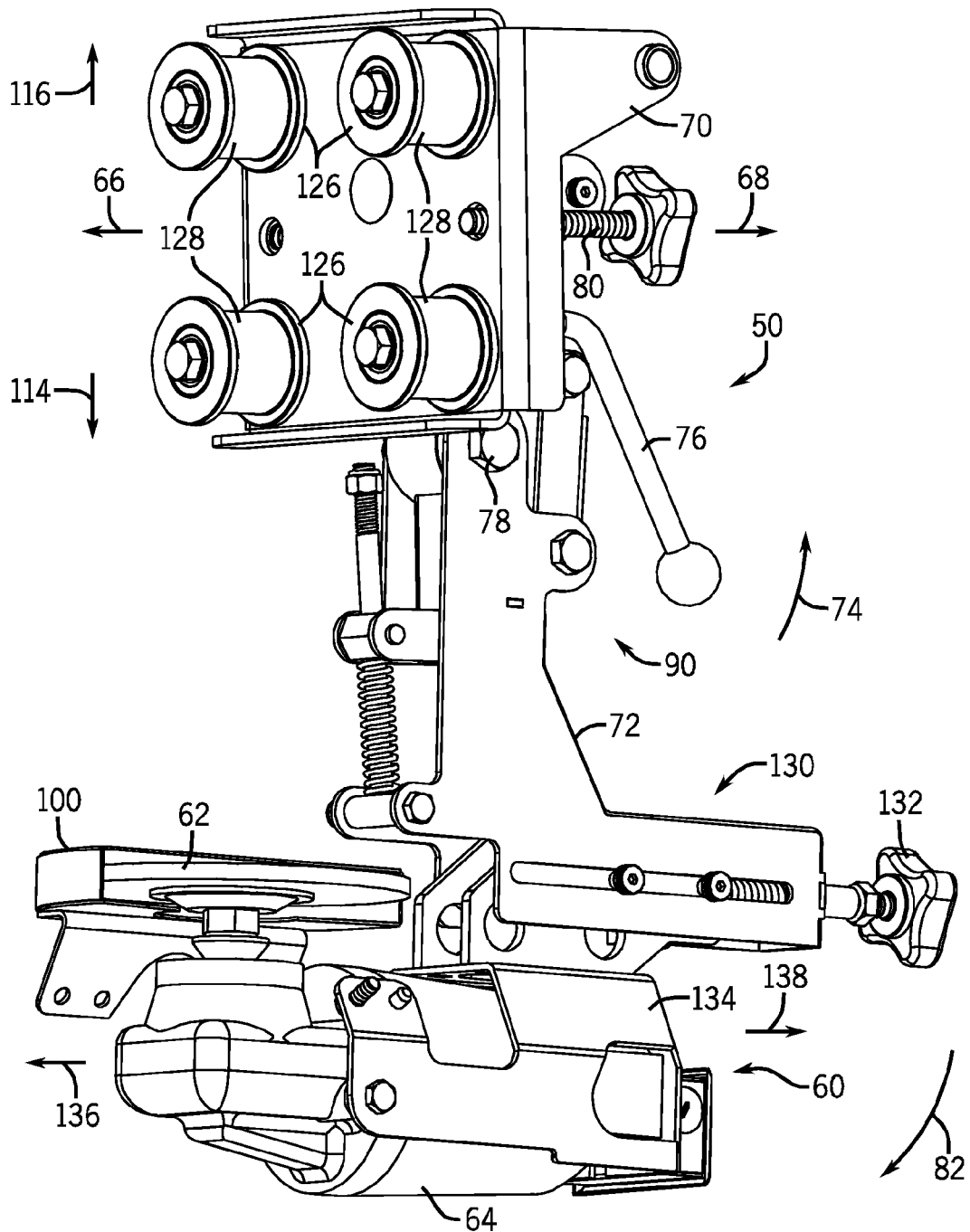
FIG. 4 is a back perspective view of the sharpening assembly shown in FIG. 2.

FIG. 4 is a back perspective view of the sharpening assembly 50 shown in FIG. 2. As illustrated, the carrier 70 includes four wheels 126 configured to engage the rail 56. The wheels 126 are configured to secure the sharpening assembly 50 to the rail 56 and to facilitate movement of the sharpening assembly 50 along the rail 56. Specifically, each wheel 126 includes a recess 128 configured to capture the rail 56. As a result, movement of the sharpener assembly 50 with respect to the rail 56 is blocked in each direction, except the directions 66 and 68. In addition, as previously discussed, the carrier 70 includes a set screw 80 configured to selectively block movement of the sharpening assembly 50 along the rail 56. While the illustrated embodiment employs a set screw 80, it should be appreciated that alternative embodiments may utilize other locking mechanisms to selectively block movement of the sharpening assembly 50 with respect to the rail 56.

In the illustrated embodiment, the sharpening assembly 50 also includes an adjustment mechanism 130 configured to vary a position of the sharpener 60 relative to the blade 22. As illustrated, the adjustment mechanism 130 includes a set screw 132 configured to drive a sharpener mount 134 in a forward direction 136 or a rearward direction 138 relative to the blade 22. Consequently, the grinder disc 62 may be aligned with the edge 54 of blades 22 having varying diameters. For example, for smaller diameter blades 22, the set screw 132 may be rotated to drive the sharpener 60 in the direction 136, thereby aligning the grinder disc 62 with the edge 54 of the blade 22. Conversely, for larger diameter blades 22, the set screw 132 may be rotated to drive the sharpener 60 in the direction 138, thereby aligning the grinder disc 62 with the edge 54 of the blade 22.

Figure 5:
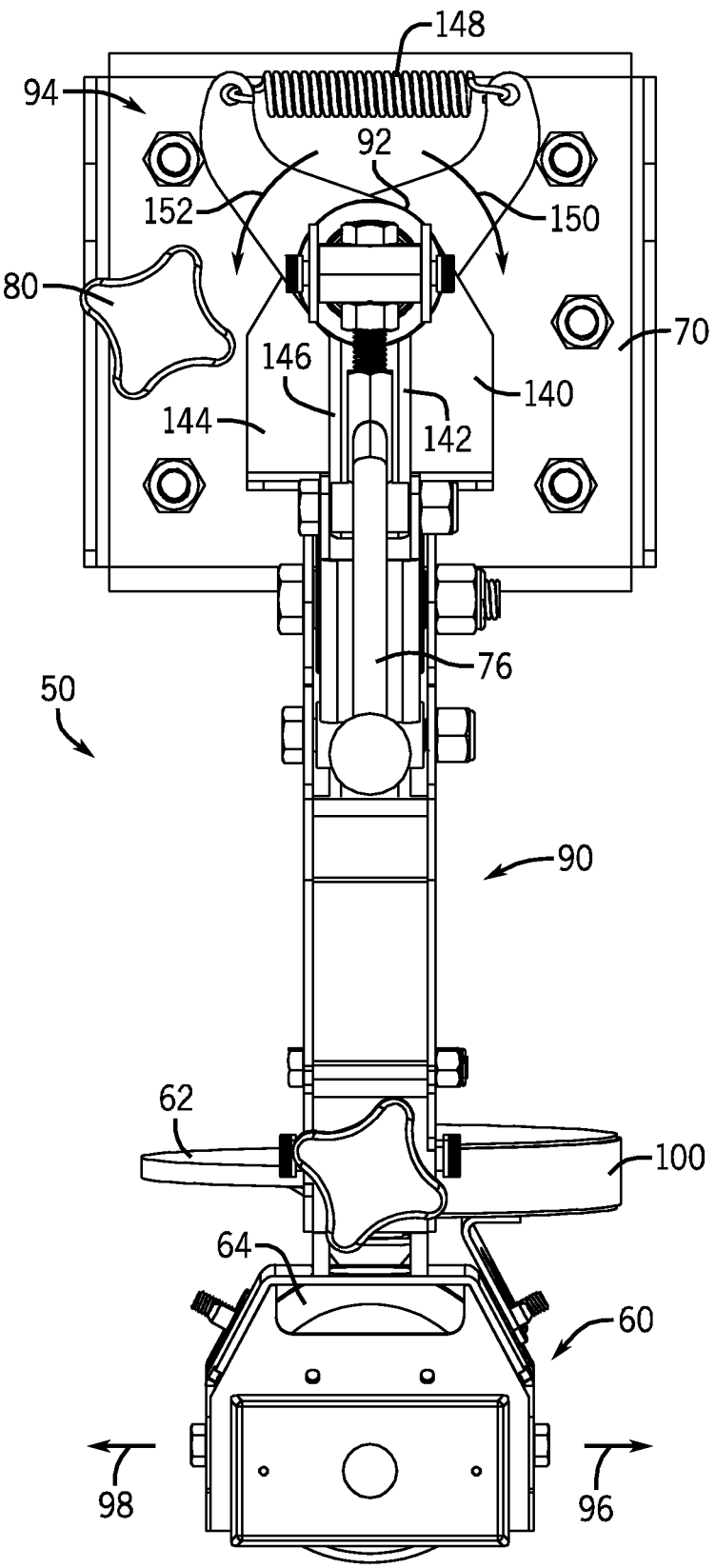
FIG. 5 is a rear view of the sharpening assembly shown in FIG. 2, showing a centering assembly.

FIG. 5 is a rear view of the sharpening assembly 50 shown in FIG. 2, showing a centering assembly 94. As previously discussed, the sharpening assembly 50 includes the pendulous arm 90 having a first end rotatably coupled to the carrier 70 by a pivot joint 92. The blade sharpening assembly 50 also includes the sharpener 60 coupled to a second end of the pendulous arm 90 and configured to engage the blade 22 of the agricultural implement 10. The pendulous arm 90 is configured to enable movement of the sharpener 60 relative to a neutral position to accommodate lateral variations in blade profile. The blade sharpening assembly 50 also includes a centering assembly 94 configured to bias the sharpener 60 toward to the neutral position. As illustrated, the centering assembly 94 includes a first arm 140 rotatably coupled to the pivot joint 92 and in contact with a first side 142 the pendulous arm 90. The centering assembly 94 also includes a second arm 144 rotatably coupled to the pivot joint 92 and in contact with a second side 146 of the pendulous arm 90. In addition, the centering assembly 94 includes a spring 148 extending between the first arm 140 and the second arm 144. The spring 148 is configured to bias the first arm 140 and the second arm 144 toward the pendulous arm 90.

For example, if the sharpener 60 is rotated in the direction 96, contact between the first side 142 of the pendulous arm 90 and the first arm 140 will drive the first arm 140 to rotate in the direction 150. Because rotation of the second arm 144 in the direction 150 is block, rotation of the first arm 140 will expand the spring 148, thereby inducing a force driving the sharpener to return to the illustrated neutral position. Conversely, if the sharpener 60 is rotated in the direction 98, contact between the second side 146 of the pendulous arm 90 and the second arm 144 will drive the second arm 144 to rotate in the direction 152. Because rotation of the first arm 140 in the direction 152 is block, rotation of the second arm 144 will expand the spring 148, thereby inducing a force driving the sharpener to return to the illustrated neutral position. As a result, the illustrated sharpening assembly 50 may enable the grinder disc 62 to accommodate lateral variations in blade profile, thereby providing the fluted blade 22 with a substantially uniform sharp edge 54.

Figure 6:
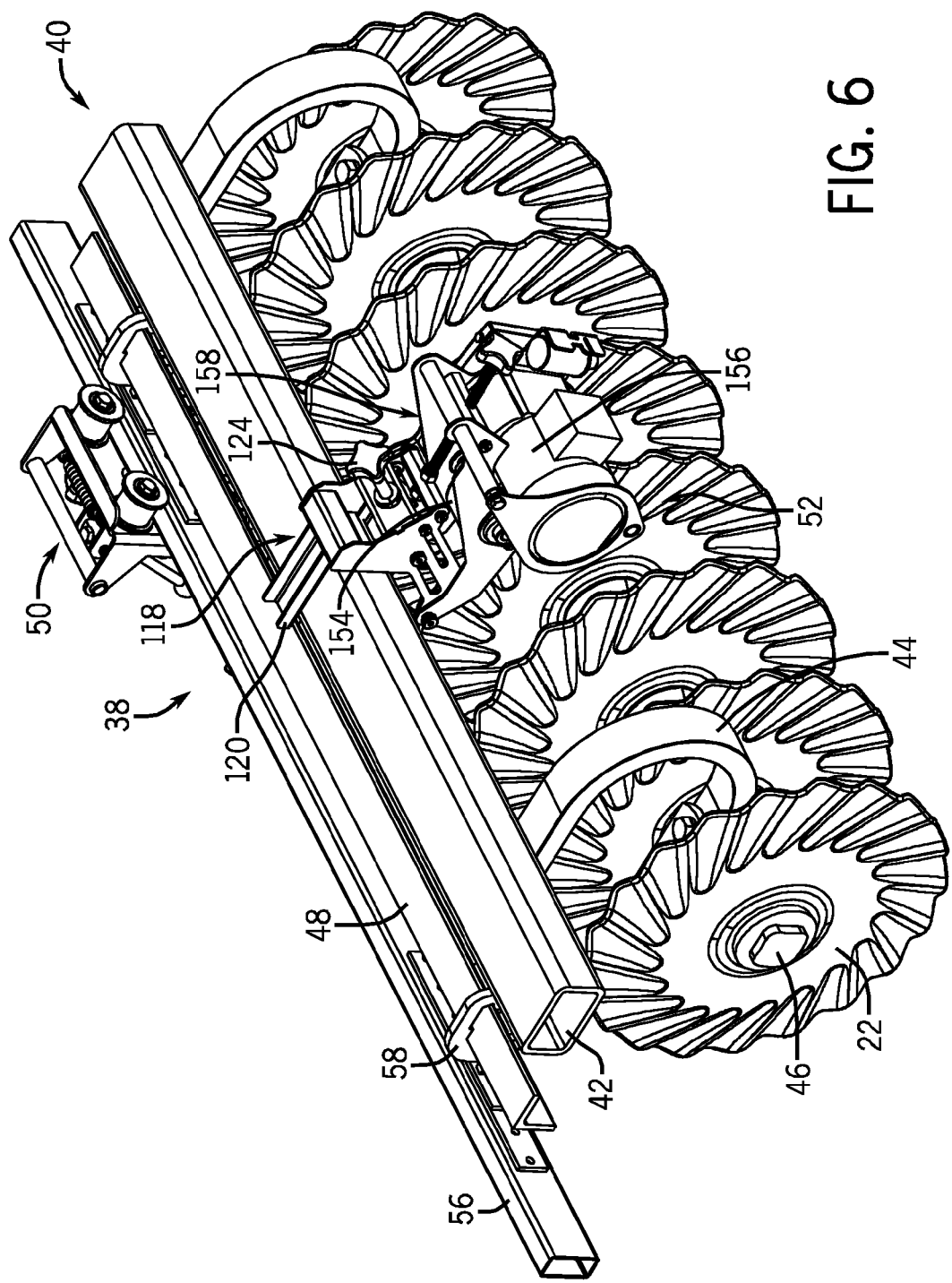
FIG. 6 is a perspective view of the blade sharpening system shown in FIG. 2.

FIG. 6 is a perspective view of the blade sharpening system 38 shown in FIG. 2. As previously discussed, the blade sharpening system 38 includes a sharpening assembly 50 and a drive unit 52. The sharpening assembly 50 is configured to sharpen an edge 54 of each blade 22, while the drive unit 52 rotates the blade 22 relative to the sharpening assembly 50. In this manner, the sharpening assembly 50 may evenly sharpen the edge 54 along the entire circumference of the blade 22. As illustrated, the drive unit 52 includes a rotating drive wheel 154 configured to engage the edge 54 the blade 22, and a motor 156 configured to drive the wheel 154. As discussed in detail below, the drive unit 52 includes an adjustment mechanism 158 configured to adjust the position of the wheel 154 relative to the clamp 118 to accommodate varying blade diameters. Because the drive unit 52 is coupled to the gang tube 42 by the clamp 118, the drive unit 52 may be readily detached from the illustrated gang 40 and coupled to a subsequent gang 40 for continued sharpening operations.

Figure 7:
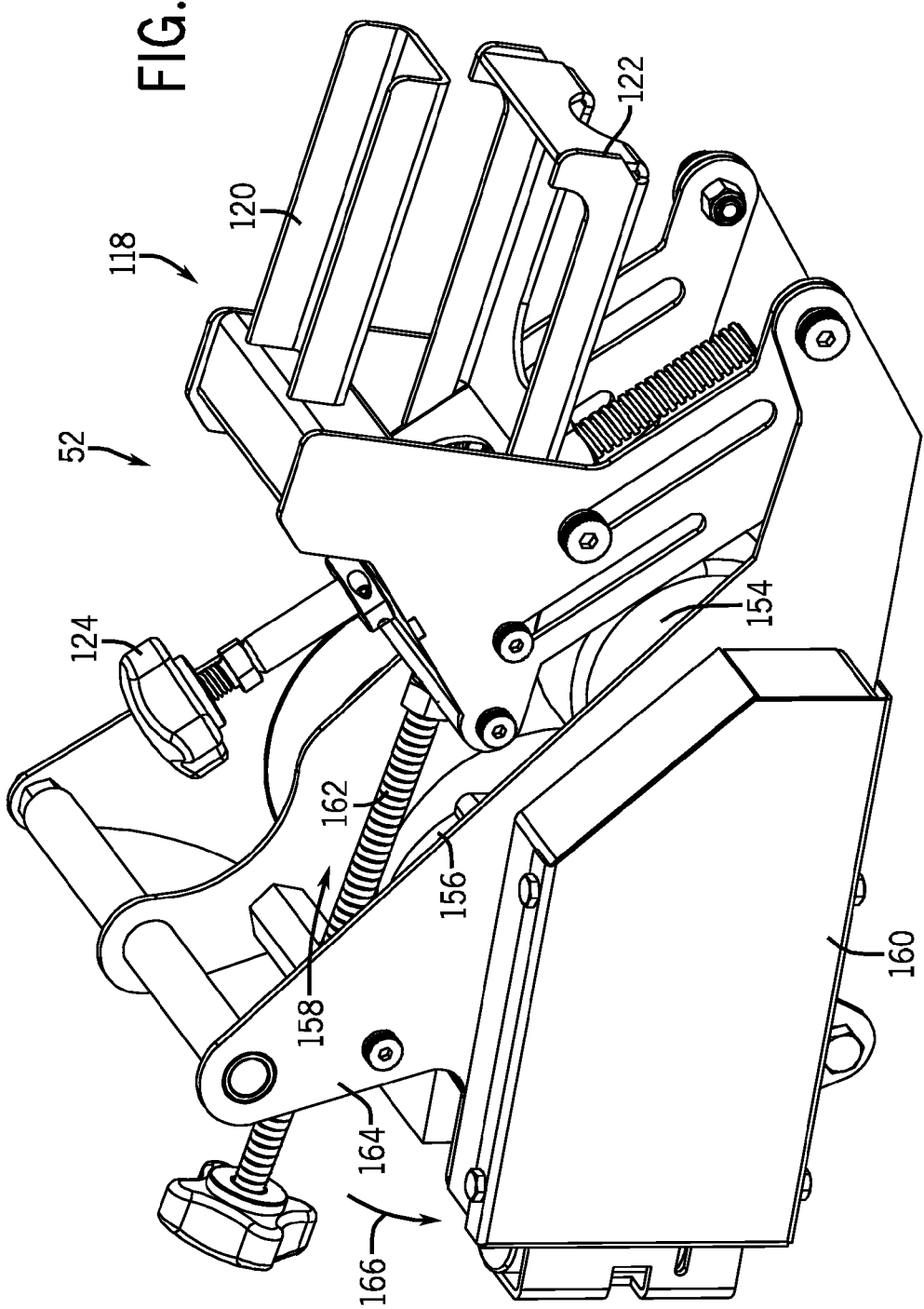
FIG. 7 is a perspective view of the drive unit shown in FIG. 3.

FIG. 7 is a perspective view of the drive unit 52 shown in FIG. 3. As previously discussed, the drive unit 52 includes a motor 156 configured to drive a wheel 154. In certain embodiments, the motor 156 may be coupled to the wheel 154 by a belt or chain. For example, an enclosure 160 may house the belt or chain configured to transfer power from the motor 156 to the wheel 154. In addition, the drive unit 52 includes an adjustment mechanism 158 configured to adjust the position of the wheel 154 relative to the clamp 118 to accommodate varying blade diameters. As illustrated, the adjustment mechanism 158 includes a set screw 162 configured to rotate a frame 164 in a direction 166 relative to the clamp 118. Because the wheel 154 is rotatably coupled to the frame 164, rotation of the frame 164 in the direction 166 will drive the wheel 154 closer to the blade 22. Consequently, the drive unit 52 may be configured to drive blades 22 of varying diameters.

Figure 8:
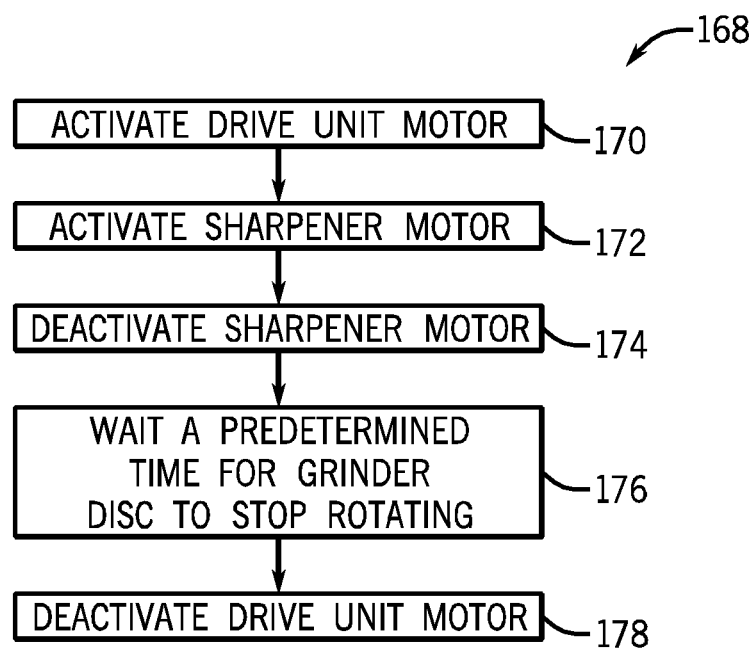
FIG. 8 is a flow diagram of an exemplary method of operating the blade sharpening system.

FIG. 8 is a flow diagram of an exemplary method 168 of operating the blade sharpening system 38. As previously discussed, operation of the sharper 60 may be coordinated with operation of the drive unit 52 such that the blade 22 is driven to rotate as the grinding disc 62 sharpens the edge 54 of the blade 22. First, as represented by block 170, the drive unit motor 156 is activated. Next, as represented by block 172, the sharpener motor 64 is activated. Ensuring that the drive unit motor 156 is running prior to activating the sharpener motor 64 substantially reduces or eliminates the possibility of excessive wear due to the grinder disc 62 continuously removing material from a portion of the blade 22. After the blade 22 has been sharpened, the sharpener motor 64 is deactivated, as represented by block 174. Next, as represented by block 176, a predetermined delay is employed to allow the grinder disc 62 to stop rotating. Finally, the drive unit motor 156 is deactivated, as represented by block 178. Waiting unit the grinder disc 62 has stopped before deactivating the drive unit motor 156 may provide a substantially uniform blade edge 54, thereby increasing the plant residue cutting effectiveness of the blade 22

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A blade sharpening system, comprising:
a base;
a pendulous arm having a first end rotatably coupled to the base by a pivot joint;
a sharpener suspended by the pendulous arm and configured to engage a generally circular agricultural implement blade while mounted on the agricultural implement, wherein the pendulous arm is configured to enable movement of the sharpener to accommodate lateral variations in blade profile; and a centering assembly configured to bias the sharpener toward a neutral position; wherein the centering assembly comprises:
a first arm rotatably coupled to the pivot joint and in contact with a first side of the pendulous arm;
a second arm rotatably coupled to the pivot joint and in contact with a second side of the pendulous arm; and
a spring extending between the first arm and the second arm, wherein the spring is configured to bias the first arm and the second arm toward the pendulous arm.

2. The blade sharpening system of claim 1, wherein the sharpening assembly comprises an adjustment mechanism configured to vary a position of the sharpener relative to the blade.

3. The blade sharpening system of claim 1, wherein the sharpener comprises a grinding disc configured to sharpen an edge of the bade, and a motor configured to drive the grinding disc in rotation.

4. The blade sharpening system of claim 1, wherein the pendulous arm comprises a joint configured to facilitate rotation of the sharpener from a blade-engaged position to a blade-disengaged position.

5. The blade sharpening system of claim 1, comprising:
a rail configured to support the base and to facilitate movement of the base along the rail; and
a mounting feature coupled to the rail and configured to engage a structural member of the agricultural implement to support the rail and sharpening assembly.

6. The blade sharpening system of claim 5, wherein the base comprises a locking mechanism configured to selectively block movement of the base along the rail.

7. The blade sharpening system of claim 1, comprising a drive unit configured to rotate the blade, wherein the drive unit comprises a wheel configured to engage the blade, and a motor configured to drive the wheel.

8. The blade sharpening system of claim 7, wherein the drive unit comprises a mounting feature configured to removably secure the drive unit to a structural member of the agricultural implement.

9. A blade sharpening system, comprising:
a base;
a pendulous arm having a first end rotatably coupled to the base by a pivot joint;
a sharpener suspended by the pendulous arm and configured to engage a generally circular agricultural implement blade while mounted on the agricultural implement, wherein the pendulous arm is configured to enable movement of the sharpener to accommodate lateral variations in blade profile; and a centering assembly configured to bias the sharpener toward a neutral position; wherein the centering assembly comprises:
a first arm rotatable coupled to the pivot joint and in contact with a first side of the pendulous arm;
a second arm rotatably coupled to the pivot joint and in contact with a second side of the pendulous arm;
a spring extending between the first arm and the second arm, wherein the spring is configured to bias the first arm and second arm toward the pendulous arm; and
a drive unit configured to rotate the blade relative to the sharpening assembly, wherein the drive unit comprises a wheel configured to engage the blade, and a motor configured to drive the wheel.

10. The blade sharpening system of claim 9, comprising:
a rail configured to support the base and to facilitate movement of the base along the rail; and
a mounting feature coupled to the rail and configured to engage a structural member of the agricultural implement to support the rail and base.

11. The blade sharpening system of claim 1, wherein the pendulous arm is configured to enable the sharpener to maintain contact with any one of a fluted blade, a concave blade, a wavy blade, flat blade, and a smooth-edged blade despite variations in blade profile.

12. A blade sharpening system, comprising:
a base;
a pendulous arm having a first end rotatably coupled to the base by a pivot joint;
a sharpener suspended by the pendulous arm and configured to engage a generally circular agricultural implement blade while mounted on the agricultural implement, wherein the pendulous arm is configured to enable movement of the sharpener to accommodate lateral variations in blade profile;
a rail configured to support the base and to facilitate movement of the base along the rail;
a mounting feature coupled to the rail and configured to engage a structural member of the agricultural implement to support the rail and base; and a centering assembly configured to bias the sharpener toward to a neutral position, wherein the centering assembly comprises:
a first arm rotatably coupled to the pivot joint and in contact with a first side the pendulous arm;
a second arm rotatably coupled to the pivot joint and in contact with a second side of the pendulous arm; and
a spring extending between the first arm and the second arm, wherein the spring is configured to bias the first arm and the second arm toward the pendulous arm.

13. The blade sharpening system of claim 12, comprising a drive unit configured to rotate the blade relative to the sharpening assembly, wherein the drive unit comprises a wheel configured to engage the blade, and a motor configured to drive the wheel.

14. The blade sharpening system of claim 13, wherein the drive unit comprises a second mounting feature configured to removably secure the drive unit to a second structural member of the agricultural implement.

15. The blade sharp in system of claim 13, wherein the drive unit and the base are separately mountable.

* * * * *